(12) United States Patent
Kania et al.

(10) Patent No.: US 8,001,932 B2
(45) Date of Patent: Aug. 23, 2011

(54) FISH SPAWNING STRUCTURE

(75) Inventors: Bruce G. Kania, Shepherd, MT (US); Frank M. Stewart, Bozeman, MT (US)

(73) Assignee: Fountainhead, LLC, Shepherd, MT (US)

( * ) Notice: Subject to any disclaimer, the term of this patent is extended or adjusted under 35 U.S.C. 154(b) by 357 days.

(21) Appl. No.: 12/045,649

(22) Filed: Mar. 10, 2008

(65) Prior Publication Data

US 2008/0245310 A1    Oct. 9, 2008

Related U.S. Application Data

(60) Provisional application No. 60/909,920, filed on Apr. 3, 2007.

(51) Int. Cl.
*A01K 61/00* (2006.01)
(52) U.S. Cl. ........................ 119/217; 119/215
(58) Field of Classification Search .......... 119/204, 119/205, 207, 208, 209, 210, 211, 215, 217, 119/218, 221, 223, 234, 236, 238, 239, 240
See application file for complete search history.

(56) References Cited

U.S. PATENT DOCUMENTS

| | | |
|---|---|---|
| 2,639,549 A | 5/1953 | Wubben et al. |
| 3,927,491 A | 12/1975 | Farnsworth |
| 4,037,360 A | 7/1977 | Farnsworth |
| 4,086,161 A | 4/1978 | Burton |
| 4,165,281 A | 8/1979 | Kuriyama et al. |
| 4,487,588 A | 12/1984 | Lewis, III et al. |
| 4,536,988 A | 8/1985 | Hogen |
| 5,106,504 A | 4/1992 | Murray |
| 5,143,020 A | 9/1992 | Patrick |
| 5,207,733 A | 5/1993 | Perrin |
| 5,224,292 A | 7/1993 | Anton |
| 5,261,185 A | 11/1993 | Koide et al. |
| 5,309,673 A | 5/1994 | Stover et al. |
| 5,312,601 A | 5/1994 | Patrick |
| 5,337,516 A | 8/1994 | Hondulas |
| 5,522,985 A | 6/1996 | Bender et al. |
| 5,528,856 A | 6/1996 | Smith et al. |
| 5,614,097 A | 3/1997 | Bender et al. |
| 5,653,193 A * | 8/1997 | Marissal ............ 119/240 |
| 5,766,474 A | 6/1998 | Smith et al. |
| 5,799,440 A | 9/1998 | Ishikawa et al. |
| 5,836,107 A | 11/1998 | Behrens |
| 5,836,108 A | 11/1998 | Scheuer |
| 5,980,738 A | 11/1999 | Heitkamp et al. |
| 5,992,093 A | 11/1999 | De Groot et al. |
| 6,008,028 A | 12/1999 | Bender et al. |
| 6,014,838 A | 1/2000 | Asher |
| 6,033,559 A | 3/2000 | Bender et al. |
| 6,086,755 A | 7/2000 | Tepper |
| 6,555,219 B2 | 4/2003 | Kosinski |

(Continued)

FOREIGN PATENT DOCUMENTS

JP    408252036 A  * 10/1996

*Primary Examiner* — T. Nguyen
(74) *Attorney, Agent, or Firm* — Antoinette M. Tease

(57) ABSTRACT

An adjustable apparatus for fish spawning that is suspended below a buoyant float system at a predetermined depth. The apparatus is resistant to vertical motion by surface waves, and may provide additional aeration for egg species that require a high level of dissolved oxygen in order to incubate successfully. The apparatus may be constructed so as to provide maximum or minimum sunlight exposure to spawning bed nests and to accommodate the spawning depth and/or preferred bed slopes of certain fish species.

1 Claim, 4 Drawing Sheets

U.S. PATENT DOCUMENTS

| | | |
|---|---|---|
| 6,615,539 B1 | 9/2003 | Obonai et al. |
| 6,946,496 B2 | 9/2005 | Mankiewicz |
| 7,060,656 B2 | 6/2006 | Kato et al. |
| 7,087,161 B1 | 8/2006 | Nishibori et al. |
| 2003/0051398 A1 | 3/2003 | Kosinski |
| 2003/0208954 A1 | 11/2003 | Bulk |
| 2005/0183331 A1 | 8/2005 | Kania et al. |
| 2006/0243659 A1 | 11/2006 | Svirklys et al. |

* cited by examiner

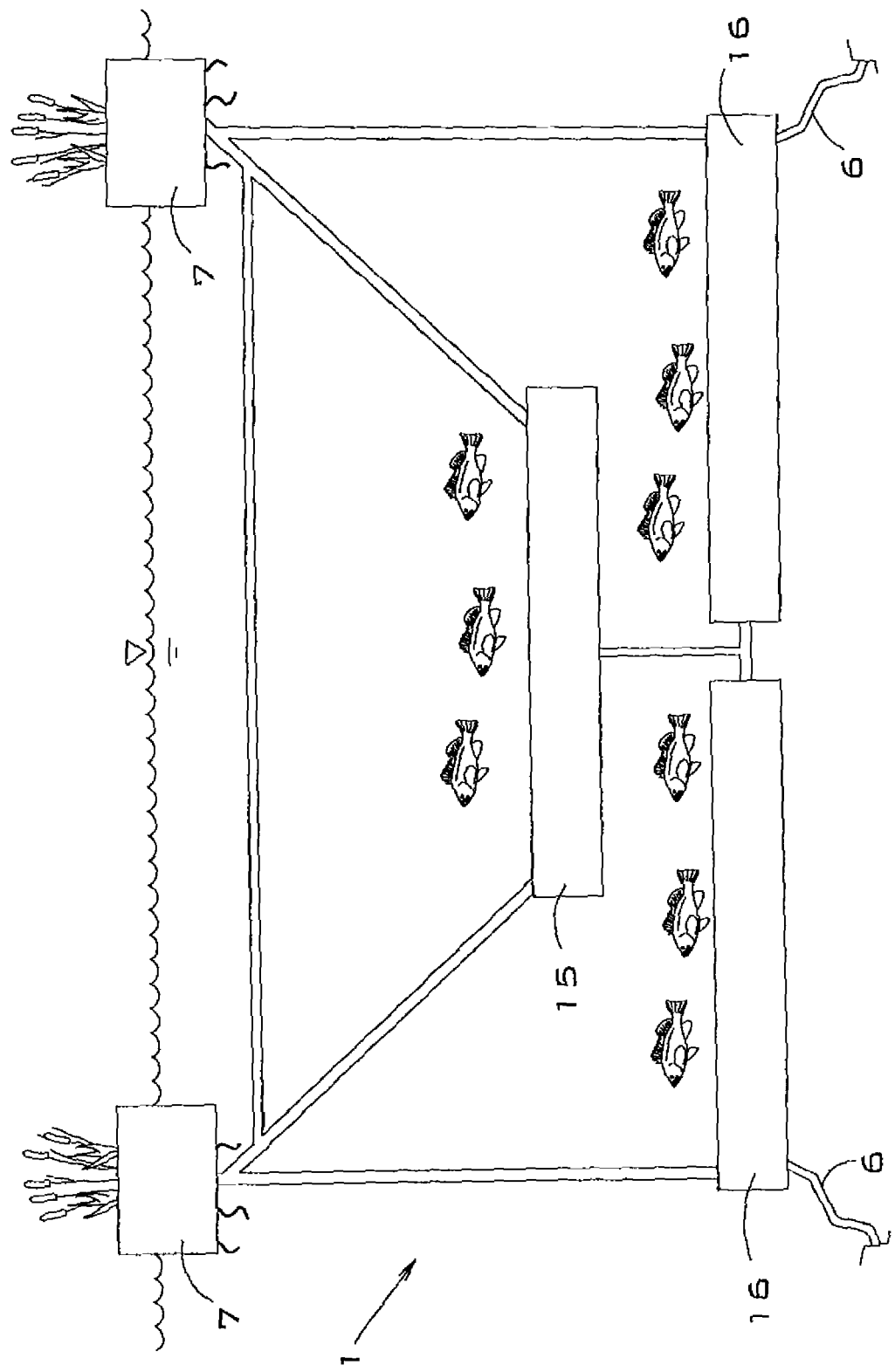

FISH SPAWNING STRUCTURE

CROSS-REFERENCE TO RELATED APPLICATION

This application claims priority under 35 U.S.C. §19(e) back to U.S. Patent Application No. 60/909,920 filed on Apr. 3, 2007.

BACKGROUND OF THE INVENTION

This invention relates to functional floating structures. In particular, the invention relates to floating fish spawning structures.

Fish reproduction in many lakes, rivers, and marine areas is less than optimal, resulting in fish populations that are lower than desirable in these waters. In many cases, the low reproduction rates are a result of lack of suitable natural spawning habitat. In some cases, natural spawning habitat has been impaired by man-caused activities; for example, suitable shallow-water gravel bed areas may be used as human swimming zones, thereby making them unattractive for spawning fish. In other areas, formerly clear waters have been muddied by man-caused agitation of the lake bottom by boat traffic, also making these areas unattractive to spawning fish. In other areas, desirable sport fish such as rainbow trout have been artificially stocked into lakes and ponds that have no zones of shallow, well aerated, gravel-covered bottom areas necessary for these fish to spawn. Since these fish cannot naturally reproduce, they must be periodically restocked to maintain the population.

There are numerous examples in the background art of inventions that provide fish spawning habitat, but all of these inventions have deficiencies that are overcome by the present invention. The background art is characterized by U.S. Pat. Nos. 5,201,136; 5,224,292; 5,528,856; 5,588,396; 5,766,474; 5,980,738; 6,086,755; 6,089,191 and 6,555,219 and U.S. Patent Application Nos. 2003/0051398; 2003/0208954; 2005/0183331; the disclosures of which patents and patent applications are incorporated by reference as if fully set forth herein.

LaMorte et al. in U.S. Pat. No. 5,201,136 describe various embodiments of fish spawning structures named "Bass Bungalows," "Cat Houses" and "Crappie Condos" for three different fish species. These structures are all designed to rest on the bottom of a water body. Also described is a "Magic Mushroom," which is an umbrella-shaped, buoyant cover that is designed to be anchored on the bottom, with the top cap providing overhead cover from predators. The structures described by LaMorte et al. are designed to rest on the bottom of a water body, and therefore can only be used for spawning at depths that are acceptable to the fish.

Yoshida in U.S. Pat. No. 5,588,396 describes an enclosed spawning case for use in an aquarium that protects the eggs from adult fish. The invention described by Yoshida is designed to be attached to the bottom or sides of an aquarium, and is not free floating.

Calinski et al. in U.S. Pat. No. 6,089,191 describe an enclosed structure with openings that serve as a shelter for fish and other marine organisms. The structure may optionally be suspended by flotation devices (specifically, one or more buoys). The suspended structures of Calinski et al. do not have wave-dampening features. The inventions of Calinski et al. and Yoshida are limited in that they teach enclosed environments.

BRIEF SUMMARY OF THE INVENTION

The purpose of the present invention is to provide optimized fish spawning in water bodies that are otherwise limited in their abilities to support fish spawning. The present invention has many advantages over background art fish habitat and spawning devices. It may be deployed at any water depth, in that the depth of the spawning bed is set by the dimensions of the invention, and is independent of water depth.

Fish that attempt to spawn in natural water bodies sometimes have their nests destroyed by desiccation when the water level drops due to draught or human activity such as hydropower generation. In preferred embodiments, the present invention is immune to fluctuations in water level, thereby allowing fish to successfully reproduce during conditions of fluctuating water levels. Furthermore, preferred embodiments of the present invention have wave-dampening features to reduce wave-induced vertical motion of the spawning bed.

A preferred embodiment of the present invention provides a natural granular spawning area in which the fish can construct spawning bed nests (or "redds"). The redds are not enclosed and are similar to the natural unenclosed conditions to which most fish are accustomed.

Fish fry can find security cover within the nonwoven fibers of preferred embodiments of the buoyant platform aid spawning bed. Larger juvenile fish can find security cover on the undersides of the buoyant platform and spawning bed.

In preferred embodiments, the depth of the spawning bed may be adjusted to provide spawning for multiple species during a single season; for example, the bed depth may be set at two feet for early-season bluegill spawning, then reset to three feet for subsequent spawning by largemouth bass.

Multiple tiered spawning beds may be installed beneath a single buoyant platform to increase spawning habitat. Moreover, the buoyant platform may be adjusted so as to provide either shade or sunlight to the spawning bed(s) below, depending on the preference of the fish species that is being attracted. The buoyant platforms may also serve as wildlife habitat for other desirable animals such as birds, mammals, amphibians and reptiles.

In a preferred embodiment, the present invention is a novel device that provides an optimized fish spawning bed that is suspended below a buoyant float system at a predetermined depth. The invention is resistant to vertical motion by surface waves, and may provide additional aeration for egg species that require a high level of dissolved oxygen in order to incubate successfully. The invention may be constructed so as to provide maximum or minimum sunlight exposure to the redds, depending on the preference of the fish species that is being attracted. The present invention may be used in either fresh water or marine applications.

Most fish species have a preferred water depth for spawning. In a preferred embodiment, the present invention provides a spawning bed area that is suspended at a fixed depth below water surface, thereby providing a means for optimizing the invention for any desired fish species whose preferred spawning depth is known.

Most fish species have a preferred spawning bed material. In a preferred embodiment, the present invention may be loaded with any suitable material, such as silt, sand, or gravel. Pockets are preferably provided in the spawning bed to prevent the loss of bedding material due to water movement.

Some fish species have a preferred bed slope. For example, if these fish are stocked into a lake having a bottom that is too steep or too flat, they cannot reproduce. The slope of the spawning bed of the current invention may be adjusted to provide any desired slope from about 0 to 45 degrees.

Some species (e.g., rainbow trout) require aeration across the nest. The present invention may be fitted with an aeration device that provides a controlled flow of air bubbles or aerated water to the eggs.

Some fish species prefer a specific water temperature for spawning. The present invention may be deployed at locations and depths that provide optimal temperatures within the water body. If a suitable temperature is not available in a particular water body, the present invention can optionally deliver cooled or warmed water to the spawning bed.

In a preferred embodiment, the invention is a fish spawning structure comprising: a plurality of positively-buoyant units, each of said positively-buoyant units being comprised of a permeable nonwoven polymer matrix and a nonpermeable buoyant polymer foam; a negatively-buoyant fishing spawning bed, said spawning bed being comprised of said permeable nonwoven polymer matrix and a polymer foam and having a recess; a plurality of connecting members that connect each of said units to said spawning bed; and a plurality of horizontal supports that connect said units together; wherein said positively-buoyant units are sufficiently positively buoyant relative to said negative buoyancy of said spawning bed to render the structure positively buoyant. Preferably, said polymer foam is comprised of either a nonpermeable buoyant polymer foam or a permeable buoyant polymer foam. Preferably, the fish spawning structure her comprises a plurality of plants growing in said buoyant units.

In a preferred embodiment, said permeable nonwoven polymer matrix is comprised of polyester fibers, polyethylene fibers or polypropylene fibers that are intertwined to form a randomly oriented web. Preferably, said permeable nonwoven polymer matrix is comprised of approximately 200-denier polyester fibers. Preferably, a water-based latex binder is baked onto said fiber, thereby increasing the stiffness and durability of said matrix. Preferably, said nonpermeable buoyant polymer foam and/or said polymer foam is comprised of a thermosetting polymer or a thermoplastic polymer. Preferably, said connecting members comprise a material selected from the group consisting of: polyvinyl chloride pipe, nylon rope, and neoprene cable.

In another preferred embodiment, the fish spawning structure further comprises a granular material that is disposed in said recess. Preferably, at least a portion of said granular material that is disposed in said recess is attached to said spawning bed. Preferably, said recess is divided into a plurality of individual pockets. Preferably, the fish spawning structure further comprises: an air injector that is operative to supply a stream of air bubbles to said spawning bed and/or a water injector that is operative to supply a stream of water to said spawning bed.

In yet another preferred embodiment, the invention is a fish spawning structure comprising: a plurality of positively-buoyant units; a negatively-buoyant fishing spawning bed; a plurality of connecting members that connect each of said units to said spawning bed; and a plurality of horizontal supports that connect said units together; wherein said units are sufficiently positively buoyant relative to said negative buoyancy of said spawning bed to render the structure positively buoyant.

In a further preferred embodiment, the invention is a fish spawning structure comprising: a substantially-opaque, positively-buoyant platform; a negatively-buoyant fish spawning bed; and a plurality of connecting members that connect said platform to said spawning bed; wherein said platform is sufficiently positively buoyant relative to said negative buoyancy of said spawning bed to render the structure positively buoyant. Preferably, the fish spawning structure further comprises an anchor line for substantially preventing the horizontal movement of the structure.

In another preferred embodiment, the invention is a fish spawning structure comprising: a plurality of positively-buoyant units; a first negatively-buoyant fish spawning bed; a plurality of first connecting members that connect each of said positively-buoyant units to said first negatively-buoyant fish spawning bed; and a plurality of horizontal supports that connect said positively-buoyant units together; wherein said units are sufficiently positively buoyant relative to said negative buoyancy of said first negatively-buoyant fish spawning bed to render the structure positively buoyant. Preferably, the fish spawning structure further comprises: a plurality of other negatively-buoyant fish spawning beds; and a plurality of second connecting members, said second connecting members connecting said other fish spawning beds to said first fish spawning bed and to said positively-buoyant units. Preferably, said other negatively-buoyant fish spawning beds are disposed at a greater depth than said first negatively-buoyant fish spawning bed.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate presently preferred embodiments of the invention. In the drawings:

FIG. 4 is a side elevation view of an alternate embodiment of the invention.

Figure 1:
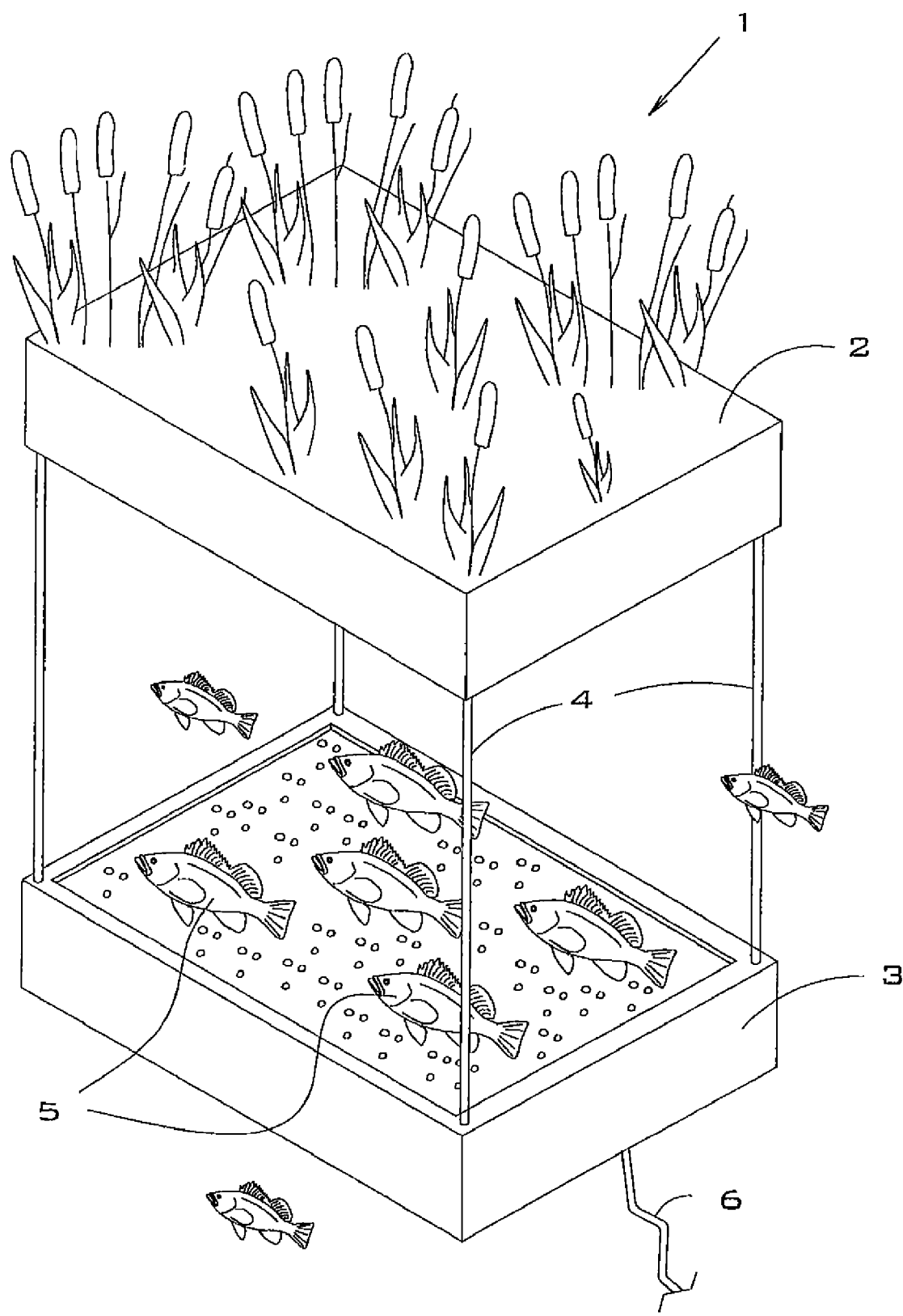
FIG. 1 is a perspective view of a first preferred embodiment of the invention.

The following reference numerals are used to indicate the parts and environment of the invention on the drawings:
  1 floating island fish spawning structure, structure
  2 buoyant platform
  3 suspended spawning bed, spawning bed
  4 vertical connecting members, connecting members
  5 spawning fish
  6 anchor line
  7 individual buoyant units, buoyant units
  8 horizontal supports
  9 permeable nonwoven polymer matrix, nonwoven matrix, matrix
  10 nonpermeable buoyant polymer foam, polymer foam
  11 plants
  12 granular material
  13 redds
  14 air or water injection system, injection device, injector
  15 upper spawning bed
  16 lower spawning bed

DETAILED DESCRIPTION OF THE INVENTION

Referring to FIG. 1, a preferred embodiment of floating island fish spawning structure 1 is presented. In this embodiment, floating island fish spawning structure 1 comprises buoyant platform 2, suspended spawning bed 3 and connecting members 4. Spawning fish 5 are shown using spawning bed 3. Buoyant platform 2 serves as a protective cover to block sunlight and shield spawning bed 3 from avian predators. The horizontal surface area of the buoyant platform 2 may be greater than or less than the horizontal surface area of the spawning bed 3. Spawning bed 3 is preferably constructed so as to be slightly negatively buoyant, while buoyant platform 2 is constructed so as to provide adequate reserve buoyancy to make the entire structure 1 positively buoyant.

The dimensions of structure 1 are preferably determined based on the water body and fish species for a particular application. For example, a floating island fish structure 1 designed for bluegill spawning in a one-acre pond may have a spawning bed with a length of 12 feet and a width of 6 feet, while a floating island fish structure 1 designed for trout spawning in a 1,000-acre lake may have a spawning bed with a length of 50 feet and a width of 30 feet. The length of connecting members 4 may be varied so as to position spawning bed 3 at any desired depth or inclination. Anchor line 6 preferably attaches structure 1 to a conventional bottom anchor.

Figure 2:
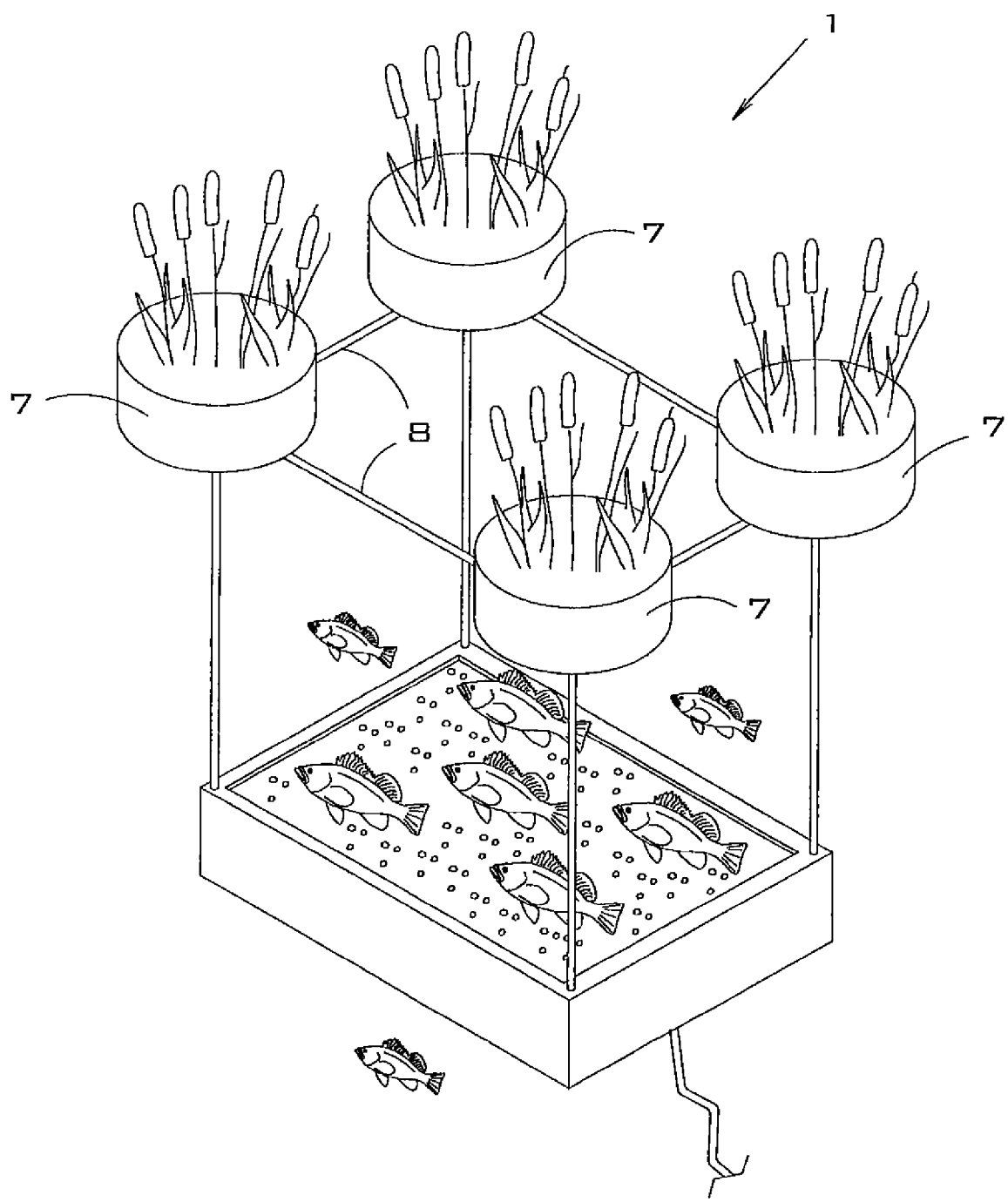
FIG. 2 is a perspective view of a second preferred embodiment of the invention.

Referring to FIG. 2, a second preferred embodiment of the invention is presented. In this embodiment, individual buoyant units 7 are used to provide flotation for structure 1. This embodiment may be preferred by fish species that require high sunlight intensity, since the individual buoyant units 7 do not block a significant percentage of incident sunlight. In this embodiment, horizontal supports 8 add rigidity to structure 1.

Figure 3:
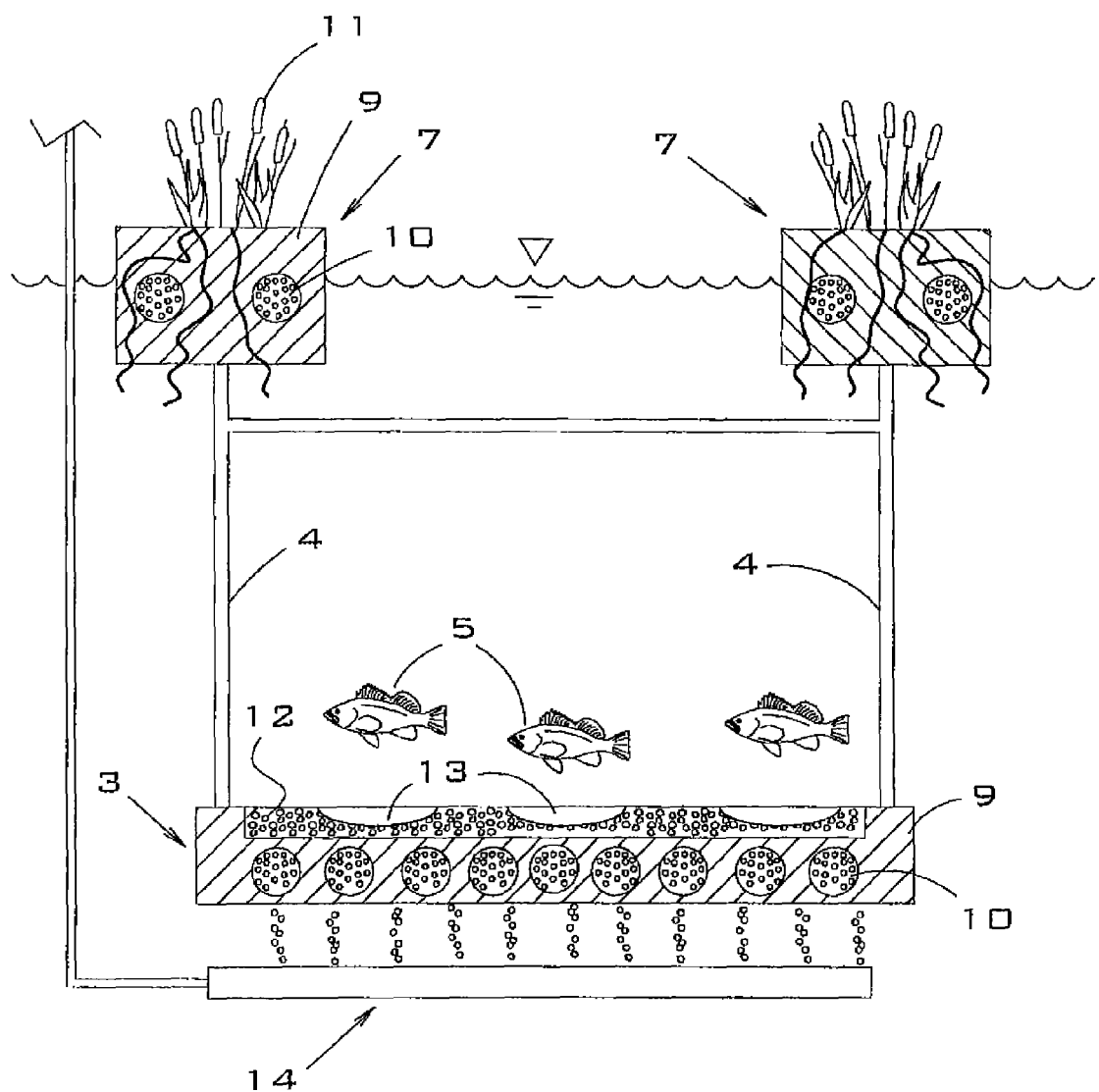
FIG. 3 is a schematic cross sectional view of the embodiment shown in FIG. 2, with the buoyant units and spawning bed shown in cross section for clarity.

Referring to FIG. 3, the individual buoyant units 7 and spawning bed 3 of FIG. 2 are shown in cross section for clarity. Individual buoyant units 7 are preferably comprised of a water-permeable nonwoven polymer matrix 9 and a water-nonpermeable buoyant polymer foam 10. The roots of optional plants 11 grow within and through the fibers of matrix 9. Optional plants 11 give the structure a more natural appearance, provide a resting place for birds and animals, and may provide a food source for fish and wildlife. Spawning bed 3 is preferably also comprised of permeable nonwoven polymer matrix 9 and nonpermeable buoyant polymer foam 10 and preferably has recesses. Buoyant units 7 preferably comprise a relatively high percentage of polymer foam 10 in order to provide the relatively large buoyancy required to float the entire structure 1. Spawning bed 3 preferably comprises a relatively low percentage of polymer foam 10, in order to offset only a portion of the negative buoyancy of the other components of spawning bed 3, thereby causing the overall buoyancy of spawning bed 3 to be slightly negatively buoyant. This slight negative buoyancy forces spawning bed 3 to sink to the desired depth rather than floating to the surface. In an alternate embodiment, the permeable nonwoven polymer matrix 9 of buoyant units 7 and spawning bed 3 may be replaced with permeable polymer foam (not shown).

Nonwoven matrix 9 is preferably comprised of polyester, polyethylene or polypropylene fibers that are intertwined to form a randomly oriented web or "blanket" with a standard thickness and width. In a preferred embodiment, matrix 9 is comprised of 200-denier polyester fibers that are intertwined to form a blanket approximately 1¾ inch thick by 56 inches wide. (Each layer of matrix is 1¾ inch thick, and the matrix 9 is typically comprised of multiple layers; for example, a 4-layer matrix is 7 inches thick.) Matrix 9 preferably is produced in a continuous strip and cut to lengths of approximately 90 feet for shipping. The nominal weight of the blanket is preferably 41 ounces per square yard. The nominal weight of the polyester fibers within the blanket is preferably 26 ounces per square yard. A water-based latex binder is preferably baked onto the fibers of matrix 9 to increase the stiffness and durability of the blanket.

The characteristics of matrix 9 may be adjusted by varying the construction materials and manufacturing process. For example, the diameter of the fibers may be varied from approximately 6 to 300 denier. Coarse fibers result in a relatively stiff matrix with relatively small surface area for colonizing microbes, and fine fibers result in a relatively flexible matrix with a relatively large surface area for colonizing microbes. The latex binder may be applied relatively lightly or relatively heavily to vary the durability and weight of matrix 9, and dye or pigment can be added to the binder to produce a specific color of matrix 9. The thickness of the blanket may be adjusted from approximately ¼-inch to 2 inches using preferred manufacturing techniques. The blankets with integral latex binder may be purchased as a manufactured item. One manufacturer of suitable matrix material is Americo Manufacturing Company, Inc. of Acworth, Ga.

Polymer foam 10 may be comprised of either thermosetting polymers or thermoplastic polymers. Polyurethane foam is an example of thermosetting foam. Polyethylene foam and polypropylene foam are examples of thermoplastic foams.

Nonpermeable polymer foam 10 comprises pores that are formed from closed cells. Permeable polymer foam comprises pores that are formed from open cells, or a combination of open and closed cells.

The buoyant portions of the invention (e.g., at least portions of buoyant platform 2 of FIG. 2 and buoyant units 6 of FIG. 3) are porous and permeable, thereby allowing wave water to flow into and out of them. This feature results in the buoyant members having less vertical movement due to wave action than would otherwise be produced by waves acting on a solid, non-permeable buoy because the buoyant members become partially and temporarily submerged when struck by incident waves rather than riding the crests and troughs of the waves. These buoyant members provide a relatively stable spawning platform that is less affected by vertical wave movement than would occur if the buoyant members were comprised of standard flotation buoys. Vertical connecting members 4 may be manufactured from any suitable durable material, which may be either rigid or flexible. Examples of suitable materials include polyvinyl chloride (PVC) pipe and nylon rope.

When structure 1 is deployed at locations with large wave heights, connecting members 4 may optionally be manufactured from materials that are elastic, such as neoprene. The elasticity of connecting members 4 further reduces the up-and-down motion of the spawning bed that is imparted to spawning bed 3 by wave action on buoyant units 7 or buoyant platform 2.

Granular material 12 such as silt, sand or gravel may be placed within the recesses of spawning bed 3. The bottom layer of granular material 12 may be optionally attached to the surface of spawning bed 3 with any suitable adhesive such as two-part poly-urea roofing coat material. Spawning fish 5 naturally carve out redds 13 in granular material 12 and deposit eggs into redds 13 for fertilization and incubation. The top surface of spawning bed 3 may optionally be divided into multiple individual pockets with raised walls (not shown) in order to better retain granular material 12.

Also shown in FIG. 3 is an optional air or water injection system 14. As shown in the drawing, injector 14 may be used to supply a stream of air bubbles to the spawning bed 3. These bubbles percolate through the permeable body of spawning bed 3, thereby supplying oxygen to eggs that are incubating on spawning bed 3. In this example, injector 14 may be any conventional aeration device, which may be powered by commercial electrical, solar, or wind energy. The injected air may optionally be cooled or heated prior to injection, thereby altering the temperature of the water surrounding the incubating eggs.

Alternately, injection device 14 may be designed to supply a stream of warmed or cooled water though spawning bed 3 and to the eggs. The power required to alter the water temperature and inject the water may be supplied by either conventional electric or solar-electric energy. Buoyant platform 2 of FIG. 1 is preferably constructed of materials similar to those used to construct buoyant units 7 of FIGS. 2, 3 and 4.

Submerged or aquatic plants will naturally become established on the buoyant platform 2 and/or buoyant units 7 over time. The submerged portions of these plants (roots, stems and leaves) can be used as a food source by herbivorous fish and fish fry.

Over time, the nonwoven fibers and submerged plants will naturally become covered with periphyton (also known as biofilm), which is a mixture of algae, cyanobacteria, bacteria and detritus. The living portion of the periphyton uptakes dissolved nutrients, gases and carbon from the water body during the production of cellular material. The living material and detritus is used as a food source by insects and fish fry. The insects and a portion of the fry are subsequently consumed by juvenile fish that remain in the vicinity of the structure for food and security cover after hatching. The packing density of the nonwoven fibers that comprise the structure (either the buoyant or the non-buoyant portions of the structure) may be designed so as to allow insects and fish fry to swim into and through the nonwoven fibers, while simultaneously providing an ideal substrate for periphyton colonization.

Referring to FIG. 4, an alternative embodiment of the invention is presented. In this embodiment, structure 1 comprises an upper spawning bed 15 and two lower spawning beds 16. Lower spawning beds 16 provide additional spawning habitat on a single spawning structure 1. As shown, portions of the lower spawning beds 16 are exposed to sunlight from above, while the remaining portions are shaded by upper spawning bed 15 and buoyant units 7. The average sunlight exposure of lower spawning beds 16 may be adjusted to meet the preference of a particular fish species. Buoyant units 7 are preferably offset horizontally from upper spawning bed 15, allowing direct sunlight exposure on the surface of upper spawning bed 15. Multiple anchor lines 6 are preferably utilized in this embodiment, thereby providing a constant orientation of structure 1, which enables better control of sunlight exposure to structure 1 and otherwise adds stability to structure 1 under windy conditions. Any of the embodiments described may utilize either single or multiple anchors.

Many variations of the invention will occur to those skilled in the art. Some variations include fish spawning structures having a single spawning bed. Other variations call for fish spawning structures having a plurality of spawning beds. All such variations are intended to be within the scope and spirit of the invention.

Although some embodiments are shown to include certain features, the applicant(s) specifically contemplate that any feature disclosed herein may be used together or in combination with any other feature on any embodiment of the invention. It is also contemplated that any feature may be specifically excluded from any embodiment of the invention.

We claim:

1. A fish spawning structure comprising:
   a plurality of positively-buoyant units;
   a first negatively-buoyant fish spawning bed;
   a plurality of first connecting members connect said plurality of positively-buoyant units to said first negatively-buoyant fish spawning bed;
   a plurality of horizontal supports connect said plurality of positively-buoyant units together;
   a plurality of second negatively-buoyant fish spawning beds;
   a plurality of second connecting members connect said plurality of second negatively-buoyant fish spawning bed(s) to said first negatively-buoyant fish spawning bed or to said plurality of positively-buoyant units;
   wherein said plurality of positively-buoyant units together are sufficiently positively buoyant relative to said negative buoyancy of said first negatively-buoyant fish spawning bed and said plurality of second negatively-buoyant fish spawning beds to render the structure positively buoyant;
   wherein said plurality of second negatively-buoyant fish spawning beds are disposed at a greater depth than and offset vertically and laterally from said first negatively-buoyant fish spawning bed; and
   wherein fish are able to access the fish spawning beds.

* * * * *